United States Patent
Rapp et al.

(10) Patent No.: US 9,548,637 B2
(45) Date of Patent: Jan. 17, 2017

(54) LINEAR ACTUATOR

(71) Applicant: FESTO AG & Co. KG, Esslingen (DE)

(72) Inventors: Martin Rapp, Kernen i.R. (DE); Erwin Bezjak, Ostfildern (DE); Martin Fuss, Uhingen (DE); Eric Angue, Kornwestheim (DE); Michael Schottner, Wendlingen (DE)

(73) Assignee: FESTO AG & CO. KG, Esslingen (DE)

( * ) Notice: Subject to any disclaimer, the term of this patent is extended or adjusted under 35 U.S.C. 154(b) by 243 days.

(21) Appl. No.: 14/245,316

(22) Filed: Apr. 4, 2014

(65) Prior Publication Data

US 2014/0300253 A1 Oct. 9, 2014

(30) Foreign Application Priority Data

Apr. 5, 2013 (DE) .................. 10 2013 005 732

(51) Int. Cl.
| | |
|---|---|
| H02K 7/10 | (2006.01) |
| H02K 7/116 | (2006.01) |
| H02K 7/102 | (2006.01) |
| H02K 7/06 | (2006.01) |

(52) U.S. Cl.
CPC .............. H02K 7/116 (2013.01); H02K 7/06 (2013.01); H02K 7/102 (2013.01)

(58) Field of Classification Search
CPC ......... H02K 5/1732; H02K 7/06; H02K 7/102
USPC .................... 310/15, 75 B, 37, 12.32, 83
See application file for complete search history.

(56) References Cited

U.S. PATENT DOCUMENTS

| | | | | |
|---|---|---|---|---|
| 5,685,390 A | * | 11/1997 | Chikuma | B62D 5/0448 180/444 |
| 6,145,395 A | * | 11/2000 | Swanson | F16H 25/20 384/55 |
| 6,223,971 B1 | * | 5/2001 | Sato | B23K 11/31 228/12 |
| 6,531,798 B1 | * | 3/2003 | Palmero | F16H 25/2018 310/112 |
| 7,541,707 B2 | | 6/2009 | Hochhalter et al. | |
| 2006/0266146 A1 | * | 11/2006 | Waide | F16H 25/2252 74/424.92 |
| 2012/0160043 A1 | * | 6/2012 | Drumm | F16H 25/20 74/89.23 |

FOREIGN PATENT DOCUMENTS

| | | |
|---|---|---|
| DE | 7638512 | 5/1977 |
| DE | 3628285 | 3/1987 |
| DE | 112005003588 | 11/2006 |
| DE | 102011051218 | 12/2012 |

* cited by examiner

*Primary Examiner* — Hanh Nguyen
(74) *Attorney, Agent, or Firm* — Hoffmann & Baron, LLP

(57) ABSTRACT

A linear actuator with an electric drive device includes a stator and a rotor, wherein the stator is arranged in a fixed location in a drive housing and the rotor is mounted for rotary motion relative to the stator and with a transmission arrangement which is arranged coaxial with an axis of rotation of the drive device to convert the rotary movement of the rotor into a linear movement, wherein a threaded spindle of the transmission arrangement is non-rotatably connected to the rotor and positively coupled to a spindle nut slidably accommodated in the drive housing and connected to a torque tube, which extends along the axis of rotation, and wherein a brake device is assigned to the rotor and/or to the threaded spindle.

12 Claims, 2 Drawing Sheets

LINEAR ACTUATOR

BACKGROUND OF INVENTION

The invention relates to a linear actuator with an electric drive device which comprises a stator and a rotor, wherein the stator is arranged in a fixed location in a drive housing and the rotor is mounted for rotary motion relative to the stator and designed for providing a rotary movement, and with a transmission arrangement which is arranged coaxial with an axis of rotation of the drive device and which is designed for converting the rotary movement of the rotor into a linear movement, wherein a threaded spindle of the transmission arrangement is non-rotatably connected to the rotor and positively coupled in the axial direction to a spindle nut slidably accommodated in the drive housing and connected to a torque tube, wherein the torque tube is mounted rotatably and slidably relative to the threaded spindle and extends along the axis of rotation, and wherein the rotor has a recess which is designed for accommodating the threaded spindle, the spindle nut and the torque tube.

From U.S. Pat. No. 7,541,707 B2, an electrically driven actuator is known in which a spindle drive comprising a threaded spindle and a spindle nut placed thereon are located in a central recess of a rotor of an electric motor designed as a hollow-shaft motor, the rotor being rotatably mounted relative to a stator which surrounds the rotor. For the rotatable mounting of the rotor relative to the stator, bearing means which can be designed as ball bearings are provided in opposite end regions of the rotor. A first bearing means is located in a first end block and a second bearing means is located in a second end block arranged at a distance from the first end block, with a protective sleeve in which the stator of the electric motor is accommodated and which is designed for a mechanical connection of the first and second end blocks extending between the end blocks.

SUMMARY OF THE INVENTION

The invention is based on the problem of providing a linear actuator which can be adapted to varying application requirements in an advantageous way.

According to a first aspect of the invention, this problem is solved for a linear actuator of the type referred to above by the features of claim 1. In this, it is provided that a brake device is assigned to the rotor and/or to the threaded spindle.

The brake device is used to influence a rotation of the rotor or of the threaded spindle in order to make possible either an automatic displacement of the torque tube if an external tensile or compressive force is introduced and/or a rapid deceleration of the rotary movement of the rotor or of the threaded spindle during a movement. The brake device is preferably selectable electrically, so that a braking operation is triggered either if electric energy is applied to the brake device or if no electric energy is present, depending on the design of the brake device.

Advantageous further developments of the invention form the subject matter of the dependent claims.

It is advantageous if bearing means for a rotatable mounting of the rotor are provided in opposite end regions of the drive housing.

In this way, the components required for the function of the electric drive device, which can also be referred to as a hollow-shaft motor, in particular the stator, the rotor and the associated bearing means, are combined in the drive housing, so that the drive device can be checked for proper function even without the remaining components of the linear actuator, such as the transmission arrangement, which comprises the threaded spindle and the spindle nut and even the torque tube. This configuration of the drive device offers the further advantage that the linear actuator can be adapted easily to its respective task by selecting a transmission unit from a modular system which covers several transmission units with different dimensions. By selecting a longer or shorter transmission arrangement, for example, a linear displacement distance for the actuator can be pre-set by simple means without any need to change the drive device.

It is expedient if a free end of the torque tube is slidably accommodated in an end cover and if a spacer designed for coupling the end cover to the drive housing is located between the end cover and the drive housing. On the one hand, the end cover provides a mechanical support for the torque tube, enabling it at least to some extent to absorb transverse forces which can act on the torque tube as the linear actuator carries out its movement task. On the other hand, the end cover can, if necessary, carry out the additional task of providing a non-rotatable mounting for the torque tube, so that the spindle nut, which is non-rotatably connected to the torque tube, cannot co-rotate if a rotary movement is introduced by the rotor into the threaded spindle, because otherwise the desired conversion of the rotary movement into the linear movement would not be possible. Depending on the application of the linear actuator, it may also be provided that the torque tube is non-rotatably located on a lever arm to be moved by the linear actuator or on another machine component, and that the drive housing is non-rotatably mounted as well, so that there is no need for an internal anti-rotation arrangement for the torque tube or the spindle nut.

The end cover is coupled to the drive housing by means of a spacer, the end cover and the drive housing being connected by means of the spacer in such a way that a transmission of torques between the end cover and the drive housing is made possible. In a particularly preferred embodiment, the mechanical interfaces between the end cover and the spacer and/or between the spacer and the drive housing are sealed in such a way that high requirements can be met relating to the separation of a volume enclosed by these components from the environment. In particular, the mechanical interfaces between the end cover and the spacer and/or between the spacer and the drive housing meet the requirements of IP65. In addition or alternatively, the outer surfaces of the drive housing and/or of the spacer and/or of the end cover are produced without any undercuts and/or recesses, resulting in each case in substantially smooth surfaces which are easy to clean, which is particularly important if the linear actuator is used in factories of the food industry. Following a selection of a suitable transmission arrangement to solve the movement task in question, the spacer may be selected from a modular system and installed into the linear actuator, the various spacers in a modular system differing from one another in their length, in particular exclusively.

In an advantageous further development of the invention, it is provided that a sensor housing including a sensor device for scanning the rotor and/or the threaded spindle is located at an end of the drive housing which is opposite the end cover, the sensor housing being coupled to a mechanical interface of the drive housing. The sensor housing can in particular be configured as a sealing end cover for the drive housing and comprises a sensor designed for determining at least one rotation-related characteristic for the rotor and/or the threaded spindle. The sensor can for example be represented by an incrementally or absolutely operating encoder which is designed for detecting the rotation of the rotor and/or the threaded spindle and for generating therefrom at least one output signal relating to the revolutions completed by the rotor and/or the threaded spindle. The sensor is preferably designed as an absolute revolution sensor suitable for determining the absolute number of revolutions for the rotor and/or the threaded spindle, whereby the position of the torque tube and the spindle nut along an axis of rotation of the rotor can be determined. The mechanical interface of the sensor housing is preferably designed for a sealing connection to the drive housing, so that this mechanical interface likewise meets the requirements relating to the separation of the volume enclosed by the sensor housing and the drive housing from the environment, in particular at least the requirements of IP65.

In a further variant of the invention, it is provided that the drive device is designed as an independently functional and checkable component. In this context, both mechanical and electric aspects have to be taken into account. The electric connections of the drive device are preferably routed directly from the stator, which is designed as a solenoid or a solenoid assembly, through the drive housing to the outside, so that a termination of the connecting cables required for the power supply of the stator, for example with suitable connectors, can be established and checked before a final assembly of the linear actuator. Alternatively, it may be provided that the connecting cables are assembled in such a way that they can be routed into the environment through the sensor housing together with the sensor cables, in order to reduce the number of cable glands on the linear actuator to a minimum. In this case, the connecting cables are directly connected to a test apparatus for testing the function of the drive device.

It is advantageous if the threaded spindle is coupled to the rotor positively and/or by adhesive force. For a positive connection between the rotor and the threaded spindle, an external toothing can be provided on the threaded spindle and a corresponding, preferably geometrically similar and in particular congruent, internal toothing can be provided on the rotor. The internal toothing and the external toothing are preferably designed with a constant cross-section along the axis of rotation, so that the externally toothed threaded spindle can be inserted into the internal toothing of the rotor along the axis of rotation. In addition or alternatively, the threaded spindle is joined to the rotor by adhesive force, using joining methods such as bonding, soldering, welding, in particular laser welding.

The rotor preferably comprises a hollow shaft fitted with magnet elements on the outer surface for a magnetic interaction with a coil winding formed in the stator, and the hollow shaft is assigned a hub designed for accommodating the threaded spindle. The hollow shaft is preferably thin-walled and provided with a hub provided for the connection to the threaded spindle. On the one hand, the thin-walled design of the hollow shaft ensures that the rotor has a low mass, so that the linear actuator is given advantageous dynamics in the accelerating or braking process. On the other hand, the thin-walled design of the hollow shaft provides installation space for the spindle nut, which in turn encompasses the threaded spindle, in the interior of the rotor. This is particularly important if the spindle nut is designed as a recirculating ball device, whereby a particularly low-friction and/or low-play coupling to the threaded spindle can be achieved on the one hand and the requirements relating to the provision of sufficient installation space in the axial and radial directions can be met on the other hand. The purpose of the hub is the provision of a torque transmission between the hollow shaft and the threaded spindle, and the hub therefore has to be non-rotatably connected to the hollow shaft. The hub preferably extends only along a fraction of the length of the hollow shaft, purely by way of example along approximately 25 percent of the length of the hollow shaft. In a particularly advantageous embodiment of the hollow shaft and the hub, the hub adjoins the hollow shaft as an extension and is non-rotatably connected to the hollow shaft in a region of its end face. As a result, the hollow shaft can have a simple design, in particular a sleeve-shaped design with a circular cross-section, and on the other hand the hub, which anyway involves a more complex production, includes a bearing seat for a bearing means and perhaps a mounting geometry such as a thread for the location of the bearing means. A coupling between the threaded spindle and the hub may be established positively and/or by adhesive force and/or non-positively. For a non-positive coupling between the threaded spindle and the hub, it can be provided that the hub has recesses tapering in the direction of the axis of rotation and the threaded spindle comprises a corresponding, in particular congruent, conical section. By inserting the conical section of the threaded spindle into the conical recess in the hub, the threaded spindle is non-rotatably coupled to the hub. In addition, securing means acting in the axial direction, such as a locknut which can be tightened onto an end section of the threaded spindle passing through the hub, can be provided.

In an advantageous embodiment of the invention, a first bearing means for the absorption of radial forces, in particular a deep-groove ball bearing for the rotatable mounting of the hollow shaft relative to the drive housing, preferably designed as a movable axial bearing, is provided between the drive housing and the hollow shaft. This first bearing means is provided for the absorption of transverse forces which can act on the hollow shaft. Such transverse forces can for example be caused by imbalances of the hollow shaft. Such transverse forces can further be present if transverse forces are introduces by the threaded spindle into the hub and the mounting of the hub cannot absorb these transverse forces completely. The first bearing means is preferably designed as a movable bearing slidably mounted on the hollow shaft or installed into the drive housing, in order to avoid a static over-determination of the mounting for the hollow shaft.

It is expedient if a second bearing means for the absorption of radial forces and axial forces, preferably a pair of angular ball bearings, in particular in an X-arrangement, is provided between the drive housing and the hub for the rotatable mounting of the hub relative to the drive housing, this being preferably designed as an axial fixed bearing. The second bearing means therefore has the task of supporting the axial forces generated during the movement of the torque tube, so that the torque tube can provide the desired compressive and/or tensile forces required to act on a machine component joined to the torque tube, such as a lever arm. The second bearing means is further used for the absorption of radial forces, which may for example be generated by transverse forces being introduced from the machine component into the torque tube and from there via the threaded spindle and the hub into the hollow shaft. An advantageous embodiment of the second bearing means is a pair of angular ball bearings which is joined in a fixed manner to the hub and to the drive housing and which therefore serves as a fixed bearing for the hollow shaft and is capable of absorbing both axial and radial forces. In an X-arrangement, the two angular ball bearings of the second bearing means are designed and arranged such that axes between points of contact of bearing bodies intersect in a common point between the respective outer races and the respective inner races of the angular ball bearings.

The brake device is preferably located between the drive housing and the end cover. The brake device therefore projects into the cavity enclosed by the spacer, so that the brake device does not have any negative effect on the external dimensions of the linear actuator. The brake device is preferably designed as an electric brake device which may optionally be configured as a blocking brake or as an operating brake. In a blocking brake, the movement of the rotor and/or the threaded spindle is blocked until an electric current is suitably applied to the brake device. A movement of the rotor and/or the threaded spindle is preferably possible only if electric energy is applied to the brake device, while no movement of the rotor and/or the threaded spindle is possible in the absence of electric energy. In contrast, if the brake device is designed as an operating brake, electric energy has to be supplied if the rotor and/or the threaded spindle is to be braked. It is preferable if a brake device designed as a blocking brake can be used as an operating brake as well.

It is advantageous if the brake device comprises a brake disc non-rotatably connected to the rotor and/or the threaded spindle and an actuator for applying an axial force in order to make a normal force between the brake disc and the drive housing adjustable. The brake disc is therefore provided for introducing a braking torque into the rotor or the threaded spindle and is, in order to brake the rotor or the threaded spindle, pressed with the aid of the actuator in a direction of movement parallel to the axis of rotation against a stationary friction surface formed on the drive housing or the actuator in particular. The normal force applied by the actuator in this process causes a friction torque between the brake disc and the friction surface, which is determined by a coefficient of friction of a material pairing between the brake disc and the friction surface. This friction torque acts on the rotor or the threaded spindle, so that they can be decelerated, preferably within a pre-settable time, to a pre-settable rotational speed, in particular to a standstill.

In a further variant of the invention, it is provided that the actuator comprises a magnet device and/or that the brake disc is slidably mounted on the rotor or the threaded spindle. The brake device is preferably designed as a blocking brake which prevents a rotation of the rotor and the threaded spindle in a state in which no electric energy is supplied. This can for example be achieved by providing that the actuator comprises a magnet device which applies a normal force sufficient for blocking the rotor and the threaded spindle to the brake disc and the friction surface without a supply of electric energy, so that the resulting braking torque ensures that the rotor and the threaded spindle are reliably stopped. In a particularly preferred embodiment, the magnet device comprises a permanent magnet arrangement and an electric coil arrangement, wherein the electric coil arrangement can optionally be supplied with electric energy in such a way that it makes the magnetic forces of the permanent magnet arrangement which act on the brake disc as a normal force either stronger or weaker. If the magnetic forces of the permanent magnet arrangement are weakened, the normal force can be reduced in such a way that the resulting friction torque is lower than the torque of the drive unit supplied with electric energy, whereby a rotary movement of the rotor and the threaded spindle and an associated linear movement of the spindle nut and the torque tube are caused. If the magnetic forces of the permanent magnet arrangement are made stronger, the normal force can be increased in such a way that the resulting friction torque is higher than the torque of the drive unit supplied with electric energy, whereby the rotary movement of the rotor and the threaded spindle and an associated linear movement of the spindle nut and the torque tube can be decelerated. The permanent magnet arrangement and the electric coil arrangement are preferably matched to one another in such a way that the normal forces which are exclusively introduced into the brake disc by the permanent magnet arrangement are sufficient to hold the rotor and the threaded spindle in a non-operative state and to decelerate the rotor and the threaded spindle from their state of motion, while the electric coil arrangement is dimensioned such that it can cancel the magnetic forces of the permanent magnet arrangement sufficiently to allow an at least almost normal force-free operation of the brake device. As a result of the slidable arrangement of the brake disc along the rotor or the threaded spindle, the brake disc applies only low, if any, frictional forces to the friction surface if no or only low normal forces are applied, and if high normal forces are provided, these normal forces are largely and in particular completely applied by the brake disc to the friction surface. If the brake disc is mounted in a stationary arrangement, on the other hand, it either has to be accepted that the brake disc, even if not subjected to normal forces, is in permanent frictional contact with the friction surface or that, in order to apply a braking torque, a part of the normal forces has to be used for the deformation of the brake disc to bring the latter in contact with the friction surface. A brake device with a brake disc which is slidably mounted on the rotor or the threaded spindle therefore offers a higher efficiency and affects the efficiency of the drive device only very slightly, if at all.

In an advantageous further development of the invention, the brake disc is designed for interaction with magnetic forces of the magnet device. Preferably, it is provided that the brake disc is made of a magnetisable material or at least has a magnetisable material component, so that the magnetic forces provided by the actuator immediately result in a magnetic interaction with the brake disc and, in the brake device according to the invention, in a normal force which is oriented at least substantially parallel to the axis of rotation of the rotor. The brake disc can be slidably mounted on a brake disc support, which is in turn mounted in a fixed position, i.e. non-rotatably and non-displaceably, on the rotor or on the threaded spindle. The brake disc is preferably joined to the brake disc support by means of a spring arrangement, the spring arrangement being designed such that an axial mobility of the brake disc combined with its non-rotatable mounting relative to the brake disc support can be ensured. This being so, the brake disc support has the task of transmitting the braking torque caused by the action of normal forces on the brake disc to the rotor or the threaded spindle. In an alternative embodiment, the brake disc support is likewise non-rotatably and non-slidably mounted on the rotor or the threaded spindle, and the brake disc is non-rotatably and slidably mounted on the brake disc support. This can for example be ensured by using pin-type fastening means oriented parallel to the axis of rotation, which provide a non-rotatable and slidable location of the brake disc on the brake disc support.

According to a second aspect of the invention, the problem on which the invention is based is solved for a linear actuator of the type referred to above.

In this, it is provided that the linear actuator is fitted with a drive device comprising a stator and a rotor, the stator being installed in a stationary arrangement in a drive housing and the rotor being rotatably mounted relative to the stator and designed for the provision of a rotary movement, and with a transmission arrangement which is arranged coaxial with an axis of rotation of the drive device and which is designed for converting the rotary movement of the rotor into a linear movement, wherein a spindle nut of the transmission arrangement is non-rotatably connected to the rotor and positively coupled in the axial direction to a threaded spindle slidably accommodated in the drive housing and extending along the axis or rotation, and wherein the rotor has a recess which is designed for accommodating the spindle nut and the threaded spindle, and wherein a brake device is assigned to the rotor and/or to the spindle nut.

In this second embodiment of a linear actuator, there is, in contrast to the first embodiment of a linear actuator described above, provided a kinematic reversal of the transmission device. The spindle nut is coupled to the rotor in a fixed arrangement and can, for example, with its outer surface be provided as a bearing seat for the rotatable mounting of the rotor relative to the stator, in particular by means of a ball bearing arrangement. For a linear movement of the threaded spindle relative to the spindle nut, the threaded spindle has to be mounted slidably and non-rotatably. This can, for example, be achieved by a suitable mounting arrangement in the drive housing. Alternatively, the non-rotatable mounting of the threaded spindle is ensured by a suitable attachment to a lever arm or machine component for the movement of which the linear actuator is used. The threaded spindle can, for example, be designed with a threaded end section for engagement with the spindle nut and with an adjoining plain guide section which has a circular cross-section in particular. The guide section is provided for passing through the end of the drive housing in order to transmit the linear movement of the threaded spindle to a lever arm or a machine component. At an exit point where the plain guide section emerges from the drive housing, a sealing device is preferably provided to prevent the ingress of dirt from the environment into the drive housing past the threaded spindle.

BRIEF DESCRIPTION OF THE DRAWINGS

An advantageous embodiment of the invention is illustrated in the drawing, of which.

DETAILED DESCRIPTION OF THE INVENTION

Figure 1:
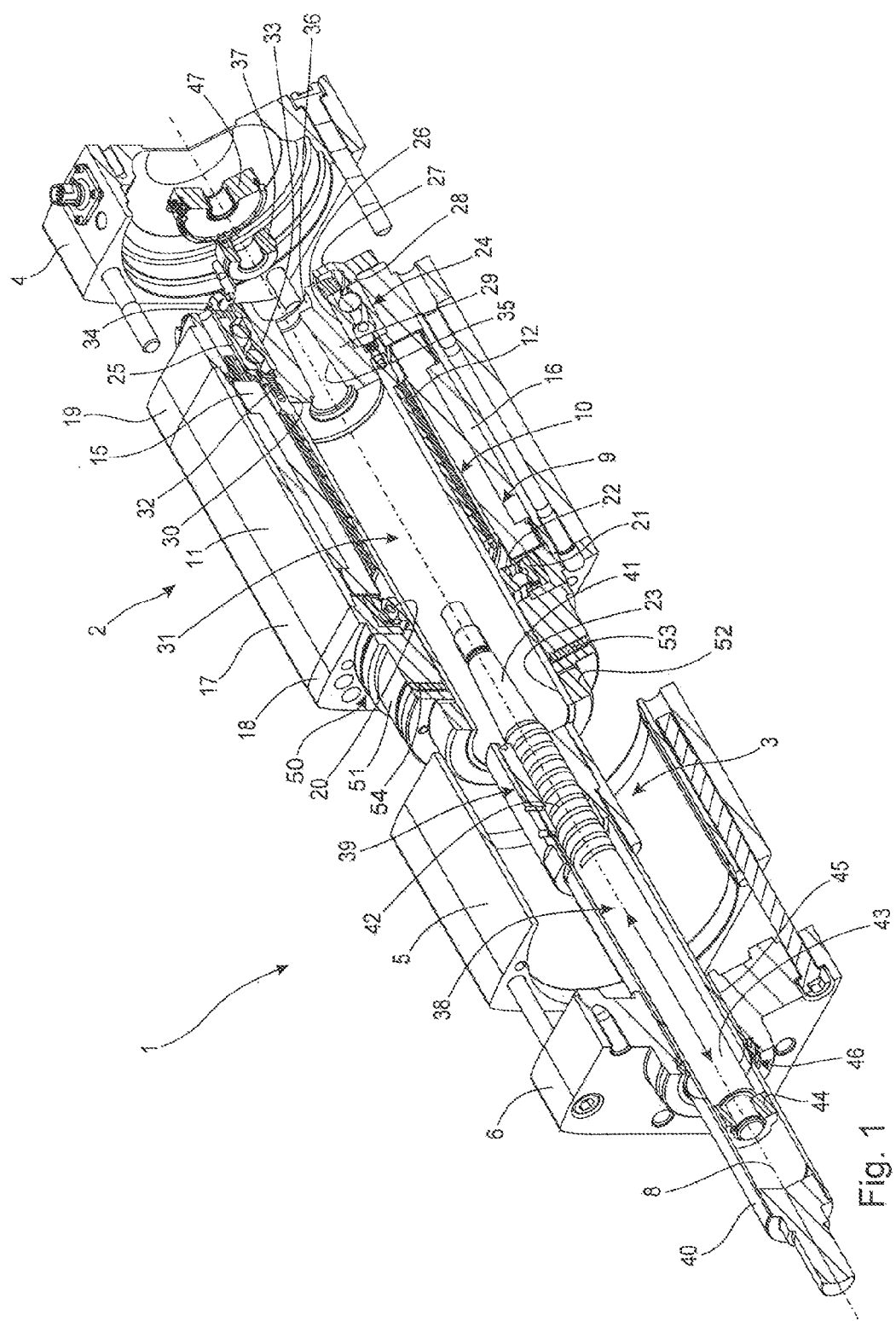
FIG. 1 is an exploded perspective sectional view of a linear actuator with the following components: drive device, transmission arrangement, sensor housing, end cover.
Figure 2:
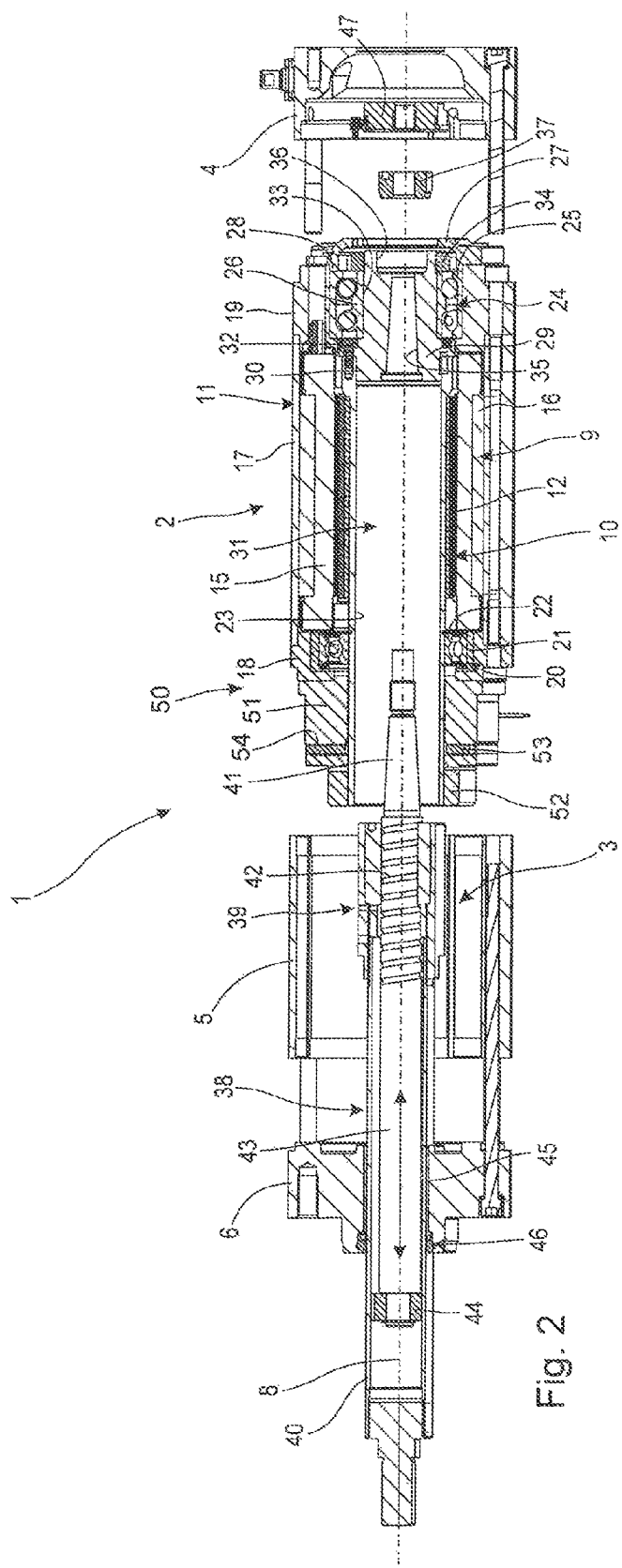
FIG. 2 is a plane sectional view of the linear actuator according to FIG. 1.

A linear actuator 1 according to a first embodiment as shown in FIGS. 1 and 2 is designed for providing a linear movement. For this purpose, the linear actuator 1 comprises an electric drive device 2 which can be connected to a transmission arrangement 3 and which can be coupled to a sensor housing 4 in a rear end region and to a spacer 5 and an end cover 6 in a front end region.

The drive device 2 is provided for the provision of a rotary movement about an axis of rotation 8, which rotary movement is converted into a linear movement along the axis of rotation by the transmission arrangement 3. In the illustrated embodiment, the drive device 2 is designed as an electric hollow-shaft motor comprising a stator 9 and a rotor 10. The stator 9 is located in a stationary arrangement in a drive housing 11, which is made up of three sections to be described in detail later in the illustrated embodiment. The rotor 10 is rotatably mounted relative to the stator 9 and comprises a plurality of magnet strips 12 oriented at its outer circumference with identical circumferential spacing, their longest outer edge being oriented along the axis of rotation 8. The magnet strips 12 are made of a permanent magnet material and allow, in combination with a coil arrangement 15 formed on the stator 9, magnetic interactions between the rotor 10 and the stator 9. By means of these interactions, which result in a rotating magnetic field if an electric travelling field is applied to the coil arrangement, the desired rotary movement of the rotor 9 about the axis of rotation 8 can be initiated. The coil arrangement 15 comprises a plurality of planar coils not shown in detail, each of which has a slight curvature in close contact with a strip-shaped section of a cylinder surface, thereby surrounding a cylindrical volume in which the rotor 10 is located, and each of which can be selected electrically. In an outer circumferential region, the coil arrangement 15 is surrounded by a cylindrical sleeve-shaped return sheath 16, which is preferably made of a ferromagnetic material. In the illustrated embodiment, the return sheath 16 is accommodated in a circular cylindrical recess of a central part 17 of the drive housing 11. In the illustrated embodiment, this central part 17 has a cross-section which is at least substantially constant along the axis of rotation, and it can in particular be represented by an extruded aluminium component. In each of the end regions of the central part 17, bearing brackets 18, 19 are fitted; these are preferably inserted into the central part 17. In the illustrated embodiment, the mechanical interfaces between the central part 17 and the bearing brackets 18, 19 are designed such that no gaps or scores remain when the bearing brackets 18, 19 are mounted on the central part 17. As a result, the smooth surface of the central part 17 is not affected by the bearing brackets 18, 19 mounted thereon.

In the front bearing bracket 18 of the illustrated embodiment, a bearing means designed as a deep-groove ball bearing 20 is provided, an outer race 21 of which is non-rotatably and non-slidably accommodated in the front bearing bracket 18. An inner race 22 of the deep-groove ball bearing 20 is slidably mounted on a hollow shaft 23 assigned to the rotor 10. In the illustrated embodiment, the hollow shaft 23 almost extends along the entire length of the central part 17, passes through the deep-groove ball bearing 20 and the front bearing bracket 18 and projects beyond the front bearing bracket 18 in a direction away from the central part 17.

In the rear bearing bracket 19, the second bearing means is located, which is designed as an angular ball bearing 24 in the illustrated embodiment. An outer race 25 of the angular ball bearing 24 is non-rotatably and non-slidably accommodated in the rear bearing bracket 19, which may for example be accomplished by press-fitting the outer race 25 into the rear bearing bracket 19. In the illustrated embodiment, the outer race of the angular ball bearing 24 is additionally located by a retaining ring 27, which may be joined, in particular bolted, to the rear bearing bracket 19. For this purpose, the retaining ring 27 of the illustrated embodiment has an annular collar 28, which bears against the end face of the outer race 25 of the angular ball bearing 24, thereby locating it in the rear bearing bracket 19. An inner race 26 of the angular ball bearing 24 is mounted in a stationary position, i.e. non-rotatably and non-slidably, on a hub 29. In the illustrated embodiment, an annular collar 30 of the hub 29 engages with a cylindrical recess 31 of the hollow shaft 23. The hub 29 is for example fixed to the hollow shaft 23 by a threaded assembly comprising a plurality of screws 32 distributed along the circumference. At a section of the hub 29 which is remote from the hollow shaft 23, a bearing seat 22 is formed on which the inner race 26 of the angular ball bearing 24 is located. In the illustrated embodiment, the inner race 26 is securely fixed by means of a threaded ring 34, which is tightened onto a male thread on the hub 29, which is not shown in detail. The angular ball bearing 24 therefore forms a fixed bearing for the rotor 10. The hub 29 is provided with a recess 35, which in the illustrated embodiment tapers conically in the direction of the axis of rotation 8, the recess 35 having a wider diameter in an end region of the hub 29 remote from the hollow shaft 23. This wider diameter is used to accommodate a locknut 37, which ensures an axial and therefore non-rotatable location of a threaded spindle 38 in the hub 29.

The threaded spindle 38 is a part of the transmission arrangement 3, which further comprises a spindle nut 39 and a torque tube 40. The threaded spindle 38 has a conical section 41 which is matched to the geometry of the conically tapering recess 35 in the hub 29 and which is used for a non-positive location of the threaded spindle 38 in the hub 29. The threaded spindle 38 further comprises a threaded section 42, which adjoins the conical section 41 and which is provided for a rotatable coupling to the spindle nut 39, this coupling being positive in the axial direction. The threaded section 42 is adjoined in the axial direction of the threaded spindle 38 by a guide section 43, on the outermost end of which a bearing means, which is designed as a sliding bushing 44 in the illustrated embodiment, is provided for a non-rotatable and slidable mounting of the threaded spindle 38 relative to the torque tube 40.

The torque tube 40 is non-rotatably connected to the spindle nut 39, which is in turn in positive engagement with the threaded section 42 of the threaded spindle 38 in the axial direction and is designed to be rotatable relative to the threaded spindle 38. This allows a free rotary movement of the spindle nut 39 relative to the threaded spindle 38, while in the axial direction of the threaded spindle 38 there is a translational positive coupling between the threaded spindle 38 and the spindle nut 39. This means that, if the threaded spindle 38 is rotated relative to the spindle nut 39 and provided that a simultaneous rotary movement of the spindle nut 39 is prevented, there is a translational relative movement between the spindle nut 39 and the threaded spindle 38, the resulting displacement depending on the number of revolutions of the threaded spindle 38 and the pitch of the thread formed on the threaded section 42. The spindle nut 39 preferably comprises a recirculating ball device not shown in detail, so that between the spindle nut 39 and the threaded section 42 there is provided a plurality of ball-shaped rolling bodies not shown in the drawing, which on the one hand ensure the desired positive engagement between the spindle nut 39 and the threaded section 42 in the axial direction and on the other hand allow the spindle nut 39 to rotate freely against the threaded spindle 38.

To ensure a conversion of a rotary movement of the threaded spindle 38 into a translational movement of the torque tube 40, the composite comprising the spindle nut 39 and the torque tube 40 has to be supported non-rotatably against the drive housing 11. In the illustrated embodiment, this support can be provided by a pin not shown in the drawing, which is oriented in the radial direction, located in the end cover 6 and engages with a slot-like recess in the torque tube, which extends along the axis of rotation and is not shown in the drawing; this prevents the rotation of the torque tube 40, which is slidably accommodated in the end cover 6, relative to the end cover 6. In another embodiment of the linear actuator 1, there is no provision for securing the spindle nut 39 and the torque tube 40 against rotation relative to the drive housing 11. On the contrary, the drive housing 11 on the one hand is secured against rotation relative to the spindle nut 39 and the torque tube 40 on the other hand by the machine or apparatus not shown in the drawing on which the linear actuator 1 is mounted. This can, for example, be achieved by providing that both the torque tube 40 and the drive housing 11 are non-rotatably mounted on the machine or apparatus regarding a rotation about the axis of rotation 8.

In the end cover 6, there is further provided a bearing bush 45, which encompasses the torque tube 40 in close contact and allows transverse forces which act on the torque tube 40 in a direction transverse to the axis of rotation 8 to be supported. In an outward-facing end region of the end cover 6, there is further provided a continuous lip seal which is intended to prevent an ingress of dirt and/or moisture into a volume bounded by the drive housing 11, the end cover 6 and the spacer 5 provided between the drive housing 11 and the end cover 6.

The illustrated embodiment of the linear actuator 1 offers the advantage that the hollow shaft 23 of the rotor is provided with a recess 31 which accommodates the threaded spindle 38 and the spindle nut 39, so that there is no need for additional installation space along the axis of rotation 8. It is further advantageous that the ball bearings 20, 24 located in the bearing brackets 18, 19 in opposite end regions of the drive housing 11 ensure a mounting of the rotor 10 which allows its free rotation without any additional housing components, so that the drive device 2 can be made available as a tested and possibly configured or parameterised component.

The sensor housing 4 fitted to an end of the drive housing 11 which is opposite the end cover 6 supports a sensor 47 designed as an encoder, which is designed for scanning the rotor 10 and/or the threaded spindle 38. In the illustrated embodiment, the sensor housing 4 is coupled to a mechanical interface of the drive housing 11 in such a way that a smooth surface of the linear actuator 11 is ensured in the region of the sensor housing 4 as well.

In the illustrated advantageous embodiment of the linear actuator 1, a brake device 50 comprising an actuator 51, a brake disc support 52 and a brake disc 53 is located on the first bearing bracket 18. In the illustrated embodiment, the actuator 51 is non-rotatably mounted on the bearing bracket 18 and has on a surface facing the brake disc 53 an e.g. annular friction surface 54. The actuator 51 comprises a coil arrangement not shown in detail and a permanent magnet arrangement likewise not shown in detail. If electric energy is applied, both the coil arrangement and the permanent magnet arrangement can apply forces of attraction to the brake disc 53, which is slidably and non-rotatably coupled to the brake disc support 52 mounted on the hollow shaft 23 in a fixed position. The brake disc 53 can for example be mounted on the brake disc support 52 using spring means not shown in the drawing, which are elastic in the axial direction and rigid in the circumferential direction. Alternatively, the brake disc can be connected, in particular riveted, to the brake disc support 52 without using the restoring effect of spring means and with axial play. If no electric energy is applied to the coil arrangement, only the magnetic forces of the permanent magnet arrangement act on the magnetisable brake disc 53. These magnetic forces are dimensioned such that the brake disc 53 is attracted by the actuator 51 and a normal force is applied to the brake disc 53 along the axis of rotation 8, pushing it onto the friction surface 54. As a function of the coefficient of friction determined by the material pairing of the brake disc and the friction surface, the normal force introduced into the brake disc 53 results in a friction torque against the friction surface 54, which friction torque is transmitted from the brake disc 53 to the brake disc support 52 and from there to the hollow shaft 23 and which friction torque counteracts any externally induced torque which may act on the hollow shaft 23.

If a rotary movement of the hollow shaft 23 and a related linear movement of the torque tube 40 are to be allowed, the magnetic field of the permanent magnet arrangement is weakened by a suitable application of electric energy to the coil arrangement in the actuator 51, so that the normal force acting on the brake disc 53 and thus the braking torque are reduced or cancelled completely. This allows a free rotary movement of the hollow shaft 23, so that the drive energy which is made available to the drive device 2 can be converted into a linear movement of the torque tube 40 with high efficiency.

If a deceleration from this state of movement of the hollow shaft 23 and the torque tube 40 is required, a passive braking of the rotary movement of the hollow shaft 23 can be provided, wherein the weakening of the magnetic field of the permanent magnet arrangement is cancelled completely or partially, so that the magnetic forces of the permanent magnet arrangement act on the brake disc 53 as normal forces, causing it to bear against the friction surface 54 in a frictional contact and to generate a braking torque. For an emergency stop of the linear actuator 1, it may further be provided that the magnetic field of the permanent magnet arrangement is strengthened with the aid of the coil arrangement in the actuator 51, in order to generate a maximum braking power by high magnetic forces acting on the brake disc 53 as normal forces.

In such a variant of the brake device 50, it can be used both as an operating brake and as a blocking brake. If it is to be used as an operating brake only, the permanent magnet arrangement can be omitted, so that an electric energy supply for the coil arrangement is provided for the application of a braking torque.

In a linear actuator according to a second embodiment of the invention, which is not shown in the drawing, a kinematic reversal is provided for the transmission device, so that the spindle nut is non-rotatably coupled to the rotor, while the threaded spindle is non-rotatably and slidably mounted for a linear movement. The linear actuator according to the second embodiment is likewise equipped with a brake device as described above, which may for example act on the rotor or the spindle nut.

What is claimed is:

1. A linear actuator with an electric drive device comprising a stator and a rotor, wherein the stator is arranged in a fixed location in a drive housing and the rotor is mounted for rotary motion relative to the stator and designed for providing a rotary movement, and with a transmission arrangement which is arranged coaxial with an axis of rotation of the drive device and which is designed for converting the rotary movement of the rotor into a linear movement, wherein a threaded spindle of the transmission arrangement is non-rotatably connected to the rotor and positively coupled in the axial direction to a spindle nut slidably accommodated in the drive housing and connected to a torque tube, wherein the torque tube is mounted rotatably and slidably relative to the threaded spindle and extends along the axis of rotation, and wherein the rotor has a recess which is designed for accommodating the threaded spindle, the spindle nut and the torque tube, and wherein a brake device is assigned to the rotor and/or to the threaded spindle, wherein a free end of the torque tube is slidably accommodated in an end cover and a spacer designed for coupling the end cover to the drive housing is located between the end cover and the drive housing, and wherein the brake device is disposed between the drive housing and the end cover.

2. A linear actuator according to claim 1, further comprising bearing means for a rotatable mounting of the rotor provided in opposite end regions of the drive housing.

3. A linear actuator according to claim 1, further comprising a sensor housing including a sensor device for scanning the rotor and/or the threaded spindle disposed at an end of the drive housing which is opposite the end cover, the sensor housing being coupled to of the drive housing.

4. A linear actuator according to claim 1, wherein the drive device is designed as an independently functional and checkable component.

5. A linear actuator according to claim 1, wherein the threaded spindle is coupled to the rotor positively and/or by adhesive force.

6. A linear actuator according to claim 1, wherein the rotor comprises a hollow shaft fitted with magnet elements on the outer surface for a magnetic interaction with a coil winding formed in the stator, and wherein the hollow shaft is assigned a hub designed for accommodating the threaded spindle.

7. A linear actuator according to claim 6, further comprising a bearing means for the absorption of radial forces for the rotatable mounting of the hollow shaft relative to the drive housing provided between the drive housing and the hollow shaft.

8. A linear actuator according to claim 6, further comprising a bearing means for the absorption of radial forces and axial forces, the bearing means comprising a pair of angular ball bearings provided between the drive housing and the hub for the rotatable mounting of the hub relative to the drive housing.

9. A linear actuator according to claim 1, wherein the brake device comprises a brake disc non-rotatably connected to the rotor or the threaded spindle and an actuator for applying an axial force in order to make a normal force between the brake disc and the drive housing adjustable.

10. A linear actuator according to claim 9, wherein the actuator comprises a magnet device.

11. A linear actuator according to claim 9, wherein the brake disc is slidably mounted on the rotor or the threaded spindle.

12. A linear actuator according to claim 9, wherein the brake disc is designed for interaction with magnetic forces of the magnet device.

* * * * *